Dec. 6, 1938.  D. J. ALVARADO, JR  2,139,569
STEERING GEAR CONTROL SPEED REGULATOR FOR VEHICLES
Filed June 10, 1937
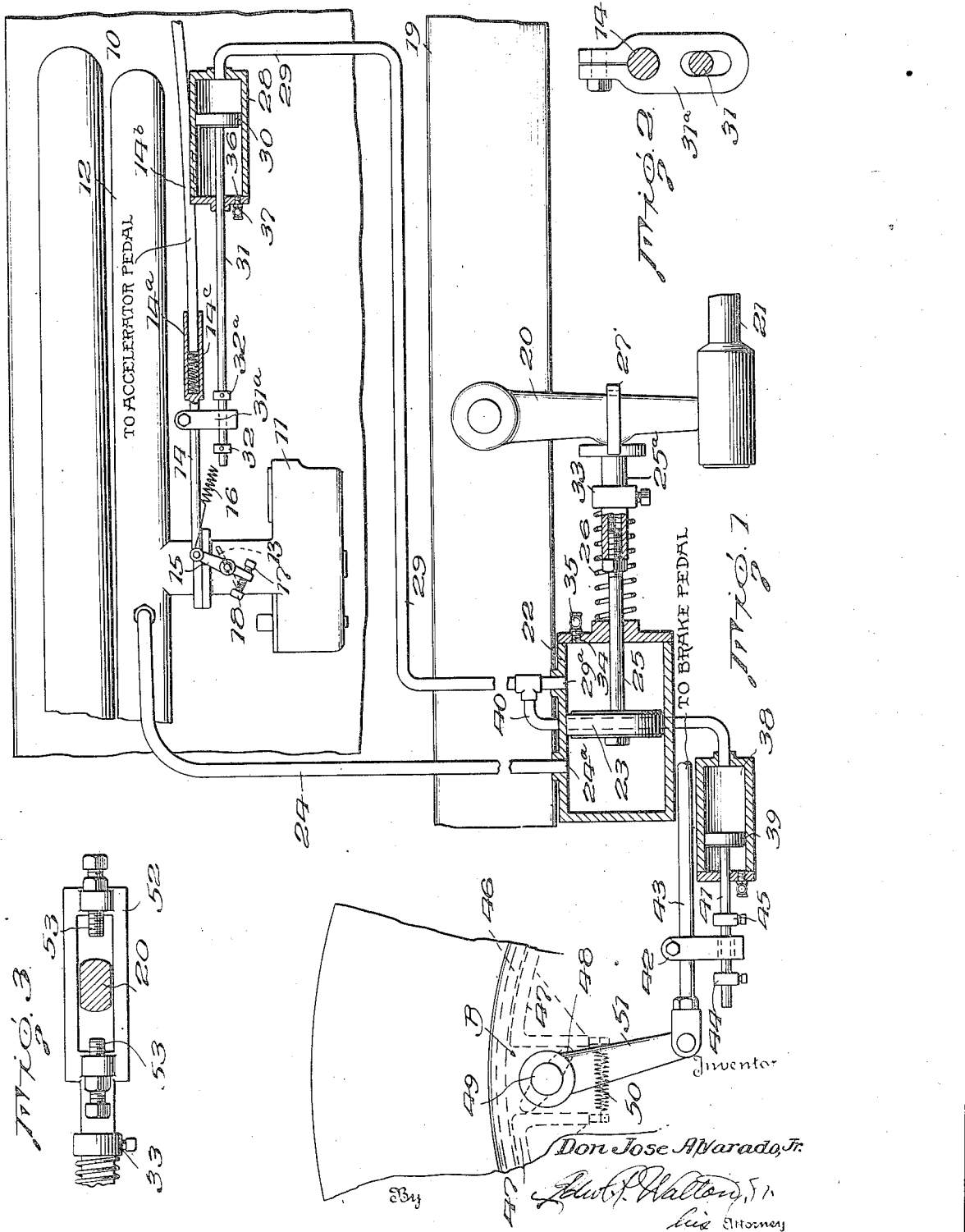

Patented Dec. 6, 1938

2,139,569

UNITED STATES PATENT OFFICE 2,139,569

STEERING GEAR CONTROL SPEED REGULATOR FOR VEHICLES

Don Jose Alvarado, Jr., Richmond, Va., assignor of one-half to William Gray, Richmond, Va.

Application June 10, 1937, Serial No. 147,578

9 Claims. (Cl. 180—82)

The present invention is a steering gear control device for regulating the speed of internal combustion engines of vehicles such as automobiles and the like.

In the operation of motor vehicles and the like, upon open roads, it frequently happens, when the vehicle is travelling at high speed, that the operator of the car attempts to make a curve while travelling at a higher speed than is safe for negotiating the curve, whereby control of the automobile is lost or due to the forces operating upon the car at such high speed, it overturns or runs off the road.

A similar condition exists when operators attempt to swerve on a road, travelling at high speed, to avoid another automobile or other objects, which condition frequently results in loss of control of the vehicle.

The object of the present invention is to overcome the above situation by automatically removing from the operator speed control of the car, when such conditions are encountered, and to automatically reduce the speed.

A still further object of the invention contemplates the application of the brakes when the speed of the car is or has been automatically reduced, thereby insuring that the speed of the car will be slackened to a degree which will insure safety of operation.

The above objects are accomplished by providing means controlled by the position of the steering gear of the vehicle which will actuate the fuel control to the power plant of the vehicle, and which may also control the operation of the brakes when predetermined positions of the steering gear have been reached.

With the above and other objects in view, which will appear as the specification proceeds, the invention resides in the details of construction, the combination and organization of parts hereinafter more fully described and pointed out in the appended claims.

In the drawing, which shows one embodiment of the invention as at present advised, Figure 1 is an elevation of sufficient of an internal combustion engine, the chassis of an automobile and the brake mechanism, to which the present invention is applied, to illustrate the invention and its operation, certain of the parts being broken away and shown in section for convenience of illustration and to show details of construction;

Figure 2 is a vertical sectional view taken through the rods 14 and 31 or 41 and 43 of Figure 1 to show the connection between said rods; and Figure 3 is an enlarged detail plan view of a modified connection between the gearing element 20 and the device of the invention.

Referring more in detail to the drawing and as a satisfactory exemplification of the invention, an internal combustion engine 10 is partially illustrated which usually has a carburetor 11 for furnishing an explosive mixture to the engine. The carburetor or the intake manifold 12 is commonly equipped with a throttle valve 13 for regulating the amount of fuel supplied to the engine, hence controlling the speed of the same. The throttle valve is also usually controlled by means of a rod 14, or the equivalent thereof, connected with a hand lever or foot accelerator (not shown) as the case may be, and with a lever 15 fast on the shaft of the throttle valve, a spring or other suitable means 16 being provided for biasing the throttle valve and the rod 14 to normally closed position.

In order to maintain the running of the engine at idling speeds, the throttle valve is maintained opened by suitable means, such as an adjustable screw 17 carried on the lever 15 and engaging a stationary abutment 18. On the chassis 19 of the vehicle, or some other suitable part, is usually found a pitman-arm or other equivalent element 20 connected to the steering gear mechanism through a connecting rod 21. All of the mechanism just described is common to most motor vehicles in one form or another.

The present invention consists in the provision of mechanism which, when the pitman-arm or element 20 has moved in either direction a predetermined distance, (thereby moving the wheels or other steering means to a position for directing movement of a vehicle in an arcuate or curvilinear path) the throttle valve, which may be opened beyond its idling position, will be returned automatically and beyond the control of the operator of the vehicle to an idling position or, at least, to reduce the flow of fuel supply to the motor, thereby reducing the speed of the latter. The mechanism just mentioned may take the form, shown in the drawing, which consists of a master cylinder 22 having a piston valve 23 slidably mounted therein and having connection with the intake manifold 12 of the engine by a suitable conduit 24, whereby the cylinder 22 is subjected to the action of the intake suction or vacuum created in the manifold during the operation of the engine 10, in a manner which is well understood.

The piston valve 23 has a connecting rod 25 extending from one end thereof through the cylinder 22 and is held into contact with the steering element 20 to follow the movement thereof by means of an expansion spring 26 of sufficient strength to resist the action of the intake suction through the pipe 24; or, the rod 26 may be positively connected to the member 20 by any suitable means such as a clamp 27. A power or servo-motor device in the form of a cylinder 28 is positioned in a convenient plate adjacent the accelerator rod 14 and is connected at one end to the master cylinder 22. The cylinder 28 has disposed in it a piston 30 from which a connecting rod 31 extends, having suitable connection with the accelerator rod 14.

It is proposed that the ports 24a and 29a, at which the conduit 24 and conduit 29 are connected to the master cylinder 22, be disposed on opposite sides of and equally spaced from the piston 23 when the latter is in normal position, that is, when the steering element 20 is in such position as to steer the vehicle in a straight line path of movement, as shown in Figure 1.

Now, assuming that the vehicle is proceeding at a high rate of speed, probably from 30 to 80 miles an hour, and approaches a curve which cannot be negotiated by it except at great risk and hazard at such speed, as the steering gear is operated to place the steering wheels in such angular position with respect to the longitudinal axis of the chassis that turn the vehicle for executing the curve, the piston valve 23 will be moved by its rod 25 either to the right or left (according to the direction of movement of the steering gear). If this degree of movement exceeds the predetermined position at which the points 24a and 29a have been disposed, one or the other is uncovered by the piston 23, thereby allowing the action of the intake suction from the manifold 12 through the conduit 24 to operate the piston 30, moving it to the right in Figure 3, whereby the accelerator rod 14 will be positively moved and thereby moving the throttle valve 13 to closing position, thus reducing the fuel supply to the engine and consequently the speed of the engine while negotiating the curve. As soon as the steering gear is operated to a position whereby it will move the valve 23 to an intermediate position between the ports 24a and 29a, the intake suction will be relieved from the conduit 29 and the throttle valve will then be under the control of the operator of the machine.

In order that the action of the piston 30, under the influence of the intake suction, may operate the accelerator rod 14 while the operator of the car is depressing the accelerator pedal (or otherwise actuating the same), any suitable means may be provided for this operation. As an example of one manner in which it may be accomplished, the rod 14 may consist of two telescoping sections at a point between the manual control element and its connection 31a with the piston rod 31. To this end an end portion of the rod 14 has a sleeve-like socket 14a in which an extension 14b of the rod 14 telescopes, there being a compression spring 14c disposed between the end of the rod section 14b and the end of the sleeve 14a, thereby providing a resilient or yielding connection in the accelerator rod 14. It will therefore be observed that the only pressure or work that the piston 30 has to overcome or do, in order to actuate the rod 14 for closing the throttle valve 13, is to overcome the pressure of the spring 14c because the spring 16 will move the throttle valve toward closing position. The spring 14c is of such strength that it will be compressed by the operation of the piston 30 but sufficient to prevent substantial compression thereof upon operation of the rod section 14b to open the throttle valve 13 when the piston 30 is not actuated. Also the piston rod 31 may have a slidable or loose connection with a link member 31a clamped on the rod 14 and may have adjustable collars 32 and 32a thereon, on opposite sides of the link 31a and normally spaced a predetermined distance therefrom. By adjustment of the collar 32, the extent of closure of the throttle valve 13 may be varied.

In order to permit a nicety of adjustment in assembly of the device or to enable adjustment to compensate for wear, the connecting rod 25 of the master cylinder may have an adjustable extension 25a thereon. The tension of the spring 26 may be varied by adjustment of the threaded collar or boss 33.

The master cylinder 22 is provided with a vent 34 on the side of the piston valve 23 which is not normally subjected to the vacuum or intake suction so that any air accumulated in that end of the cylinder may be vented and thereby permit free unhindered operation of the valve 23. The vent 34 is provided with a check valve 35 therein to permit exhaust of air from the cylinder, but preventing admission of outside air thereto. Likewise, the cylinder 28 is provided with a vent 36 having a similar check valve 37.

It is also contemplated by this invention and is a part thereof that, when the throttle valve 13 is closed by action of the steering member 20, the brakes of the vehicle will be also applied to slacken or reduce the speed of the same. This may be accomplished by a direct mechanical connection between the braking mechanism and the element 20, but as at present devised this connection is established by connecting a power device or servo-motor 38, in the form of a cylinder having a piston 39 therein and connected at one end to the suction pipe 29 by means of the conduit 40.

The servo-motor 38 is similar to the servo-motor 28 previously described and has a piston 39 therein having a piston rod 41 extending therefrom and connected by a link 42 (similar in all respects to the link 31a shown in Figure 2) clamped or otherwise attached to an operating part of the brake mechanism, such as the brake rod 43, as shown in the drawing. The piston rod 41 has collars 44 and 45 adjustably secured thereto and arranged on opposite sides of the link 42. By adjustment of the collar 44 the timing or extent of application of the brakes may be varied.

The brake mechanism is generally indicated at B, Figure 1, and it comprises a drum 46, brake shoes 47 and cam surfaces or dogs 48 on a shaft 49 for expanding the shoes 47 to braking position, in a manner well understood in the art, the shoes being biased to the non-expanded position by suitable means, such as a spring 50. The shaft 49 is oscillated by a lever 51 clamped thereto and suitably connected to the brake rod 43 or other suitable mechanism usually provided. The servo-motor 38 may operate all of the brakes of the wheels of the vehicle or there may be one provided for the braking means of each wheel.

From the mechanism just described, it will be observed that the position of the ports 24a and 29a must be predetermined in accordance with the desired angular adjustment of the steering wheels, relative to the chassis, at which it is desired for the device to operate. In the device shown in Figure 3, an adjustment may be readily made to bring the device into operation at any desired degree of angular adjustment of the wheels. This adjustment consists of a link 52 which may be substituted for the extension 25a, shown in Figure 1, the link having adjustable abutments 53 disposed on opposite sides of the steering element 20 and adapted to be engaged, respectively, by the steering element according to its direction of movement. It will thus be obvious that by a proper adjustment of the link 52 on the piston rod 25 and proper adjustment of the abutments 53, that either of the latter may be engaged by the element 20 to move the valve 23 to uncover the ports 24a and 29a for effecting the above described operation of the pistons 30 and 39 resulting in the closing of the throttle valve 13 and the application of the brakes at any desired angular position of the steering wheel of the vehicle. Of course, when the connection shown in Figure 3 is used suitable means may be employed to return the piston 23 to its normal position shown in Figure 1, and to this end the spring 26 may be utilized for moving the piston 23 in both directions to its normal position or an additional spring may be interposed between the head of the piston 23 and the end of the cylinder 22 through which the rod 25 extends.

Having thus described the invention in detail and the manner in which the same is to be performed, it is understood that the invention is not to be limited to the exact details of the description and disclosure in the drawing herewith, because the same may be modified and varied in numerous ways within the scope of the present invention, and it is desired that the invention is not to be limited beyond the scope of the appended claims.

That which is claimed is:

1. In a motor vehicle having an internal combustion engine, a throttle valve for the engine, steering means and braking means for the vehicle, moving means for both said valve and said braking means and subject to the intake manifold pressure, and means actuated by the steering means for rendering said moving means responsive to said intake manifold pressure when the steering means is in certain of its positions.

2. In a motor vehicle having an internal combustion engine, a throttle valve for the engine, steering means and braking means for the vehicle, moving means for both said valve and said braking means and subject to the intake manifold pressure and movable in one direction thereby, and means actuated by the steering means for rendering said moving means responsive to said intake manifold pressure, when the steering means is in certain of its positions.

3. In a fuel control means for internal combustion engines of motor vehicles having steering mechanism, said control means comprising a throttle valve, a manually actuated mechanism for operating the throttle valve, power means actuated by the intake manifold pressure of the engine for moving the throttle valve to closing position, and valve means actuated by the steering gear when in certain predetermined positions to render said power means effective for closing said valve, whereby the flow of fuel supply to the engine is reduced to correspondingly reduce the power to the vehicle when making curves.

4. In a fuel control means for internal combustion engines of motor vehicles having steering mechanism, said control means comprising a throttle valve, a manually actuated mechanism for operating the throttle valve, power means actuated by the intake manifold pressure of the engine for moving the throttle valve to closing position, and valve means actuated by the steering gear when in certain predetermined positions to render said power means effective for closing said valve, whereby the flow of fuel supply to the engine is reduced to correspondingly reduce the power to the vehicle when taking curves, and means permitting actuation of said pressure actuated means irrespective of the operation of said manually actuated throttle valve operating means.

5. In a fuel control means for controlling fuel in internal combustion engines of motor vehicles having steering mechanism, said control means comprising a throttle valve, manually actuated mechanism for operating the throttle valve, power means actuated by the intake manifold pressure of the engine for moving the throttle valve to closing position, and means actuated by the steering gear to render said power means effective for closing said valve, said power means being connected to the manually operated throttle valve operating means through a loose connection, and adjustable means included in said loose connection, whereby the extent of closing movement of the throttle valve by the pressure actuated means may be varied.

6. A fuel control means for internal combustion engines of motor vehicles having steering mechanism and braking mechanism therefor, said control means comprising a throttle valve, a manually actuated mechanism for operating the throttle valve, means actuated by the intake manifold pressure of the engine for moving the throttle valve to closing position, and other means for applying said braking mechanism and actuated by the intake manifold pressure of the engine, and means actuated by the position of the steering gear to render effective said pressure actuated throttle valve operating means as well as said pressure actuated brake applying means, when the steering mechanism is in certain of its positions.

7. A device as set forth in claim 6 further characterized by said pressure actuating means for closing the throttle valve and applying the brakes having a loose connection with the throttle valve, and said braking mechanism, and adjustable means included in each of said loose connections, whereby the extent of closing movement of the throttle valve and the extent of the application of brakes by the movement of said steering gear may be varied.

8. In a fuel control means for internal combustion engines of motor vehicles having steering mechanism, said control means comprising a throttle valve, a manually actuated mechanism for operating the throttle valve means actuated by the intake manifold pressure of the engine for moving the throttle valve to closing position, and means actuated by the steering gear to render said last mentioned means effective for closing said valve, said steering gear actuated means including adjustable abutments on opposite sides of the path of movement of an element of the steering gear, whereby the points at which said steering gear actuated means is effectually operated by the steering gear during the movement of the steering gear may be varied.

9. A device as set forth in claim 6 further characterized by the steering gear actuated means including adjustable abutments on opposite sides of the path of movement of an element of the steering gear, whereby the points at which said steering gear actuated means is effectually operated by the steering gear during the movement of the steering gear may be varied.

DON JOSE ALVARADO, JR.